July 1, 1969        O. FAHRE        3,452,762
AUTOMATIC REGULATING VALVE FOR VENTILATION PLANTS
Filed June 24, 1966
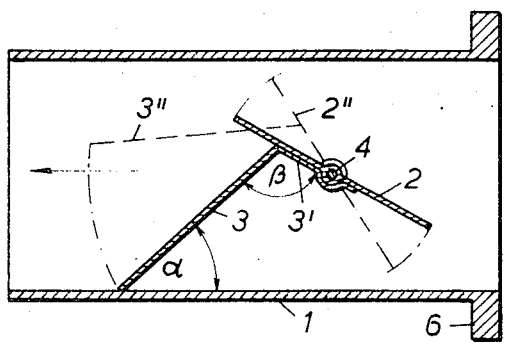
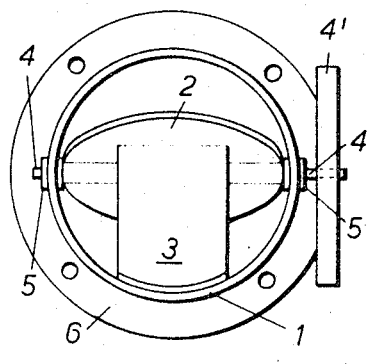
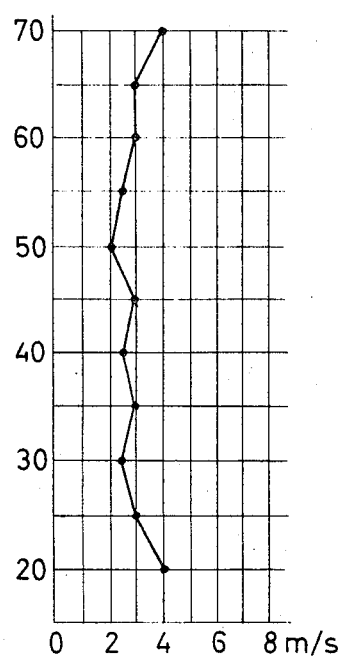
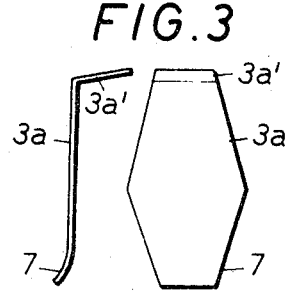
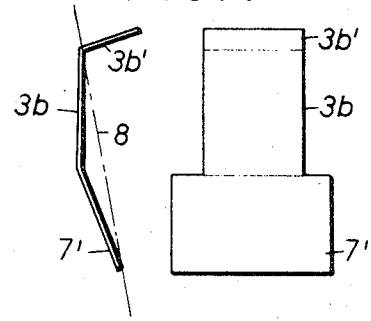
Inventor
Olav Fahre
by Michael J. Striker July 1, 1969

O. FAHRE 3,452,762

AUTOMATIC REGULATING VALVE FOR VENTILATION PLANTS

Filed June 24, 1966

Inventor
Olav Fahre
by
Michael J. Striker

United States Patent Office 3,452,762
Patented July 1, 1969

3,452,762
AUTOMATIC REGULATING VALVE FOR VENTILATION PLANTS
Olav Fahre, Chr. Krohgs Gate 28, Oslo 1, Norway
Filed June 24, 1966, Ser. No. 560,274
Claims priority, application Norway, June 28, 1965, 158,710
Int. Cl. G05d 7/01; F16k 21/00
U.S. Cl. 137—499         7 Claims

ABSTRACT OF THE DISCLOSURE

A valve for automatically regulating the flow of air through a conduit to obtain a substantially constant flow per time unit at varying pressures. A housing has a horizontal shaft mounted therein. A butterfly-type valve flap is mounted for turning movement on the shaft. A wing member is fixed to one part of the flap extending therefrom in direction of the air flow. The wing member forms with the plane of the flap an angle so selected that the wing member reaches a position of substantial parallelism with the longitudinal axis of the housing when the flap turns in a sense closing the valve passage but before the flap reaches its closing position.

---

Figure 6:
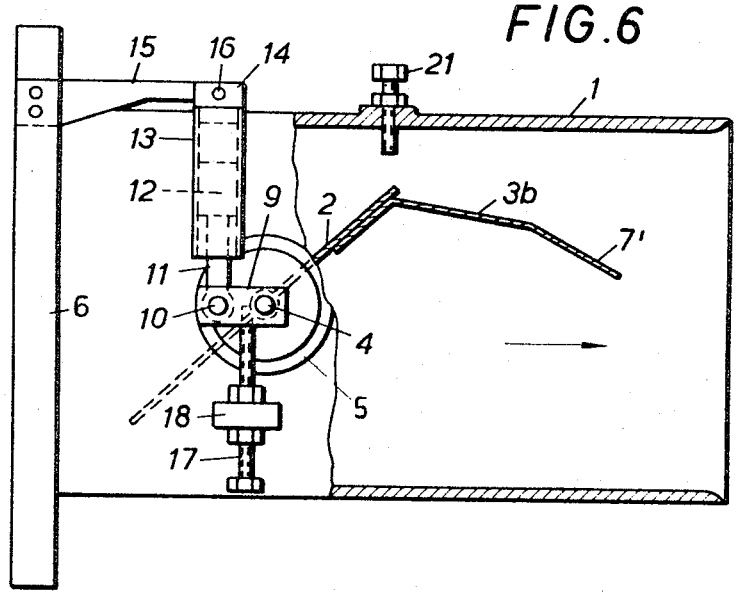

This invention relates to an automatic regulating valve for ventilation plants or the like, in which from a common supply conduit there are branched off pipes leading to the single rooms to be ventilated, in each of which branch pipes it is provided an automatic regulating valve for supply of a substantially constant air flow per time unit, independent of within which limits the pressure in the air supply conduit is varying. Said pressure may vary considerably when the pipes to the single rooms are more or less closed, in which case the pressure may vary from for instance 30 to 60 millimeter water pile.

Several types of regulating valves for this purpose are previously known, which are provided with membranes or the like of rubber which, when the ventilation air is heated during the cold season, often give off a remarkable smell of rubber. In addition hereto the heated air reduces the lifetime of a membrane.

The object of the invention is to obtain an automatic regulating valve for this purpose, which is very simple and reliable and has practically unlimited lifetime.

More accurately, the automatic regulating valve according to the invention is of the kind arranged for passing a substantially constant flow of air per time unit at varying pressure in the air supply conduit, and which comprises a regulating flap turnably arranged about a horizontal shaft in the valve housing, as well as control means co-operating with said flap. According to the invention the control means consists of a wing, which is fixed to and reaches from the upper part of the flap in the direction of the air flow, which wing forms an acute angle with the plane of the flap of such magnitude that during the turning movement of the flap said wing is turned up into a position which is substantially parallel with the longitudinal axis of the valve housing before the flap is closed.

When an air flow is conducted through a valve housing, said flow will pass over and partly under the partly open flap and influence upon the wing, so that same is lifted and thereby turns the flap for gradually throttling the air flow when said wing is lifted more and more approaching the horizontal position. The degree of lifting of the wing and, consequently, throttling of the air flow is dependent of the outgoing air flow, and when the length, width and weight of the wing and its angle with the plane of the flap are properly chosen, there may be obtained a practically constant air flow at the output side of the valve, independent of considerable pressure variation at the input side. Tests made have shown that with a valve designated for 200 m.³ air per hour the quantity of air at the output side did only vary about 2% at pressure variations in the air supply conduit of between 25 and 65 mm. water pile.

In order to damp the oscillations of the flap, the shaft of same may be connected with a pneumatic oscillation damper arranged externally of the valve housing.

Figure 7:
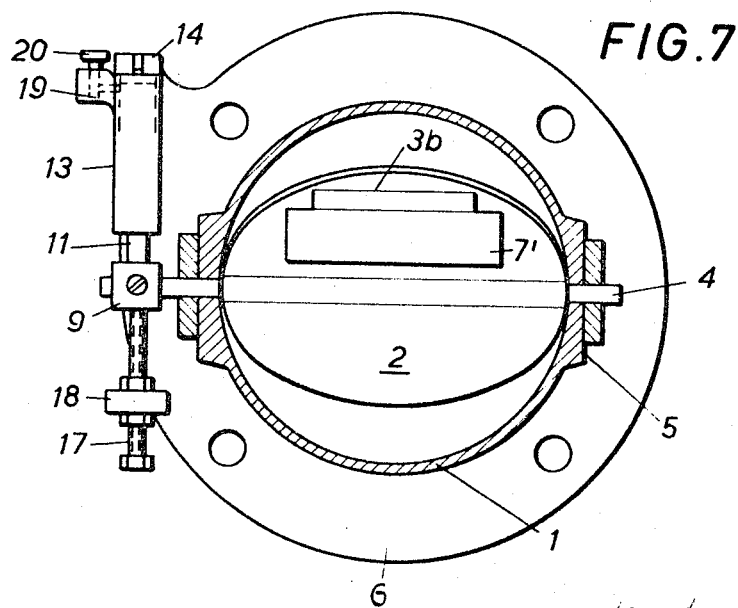

The invention is to be described with reference to the drawings, in which:

FIG. 1 shows the valve in longitudinal section,
FIG. 2 the valve seen against the output end,
FIGS. 3 and 4 two embodiments of the wing form, and
FIG. 5 a diagram obtained by tests,
FIG. 6 shows a pneumatic flap damper mounted on the axis of the flap, seen from the side, and
FIG. 7 the same seen against the output end.

In the valve housing 1, at its input end provided with a flange 6 for fixing purposes, there is arranged a turnable flap 2 fixed to a horizontal shaft. Said shaft is arranged in self-lubricating bearings 5 or ballbearings which are of small friction and do not need maintenance. A wing 3 which is directed in the direction of the air flow (as indicated by an arrow) is formed with a lap 3' bent to an angle $\beta$ with the wing proper and fixed to the upper half of the flap 2. Said angle $\beta$ may be between 90° and 130° dependent upon flow of air and the difference in pressure for which the valve is designed. In completely down turned position said wing 3, when no air passes through the valve housing, forms an angle $\alpha$ with the horizontal, which angle, according to FIG. 1, is between 30° and 40° varying with the pressure conditions and the quantity of air to be passed through. Said flap 2 and said wing 3 are shown in dotted lines 2″ and 3″ in the positions they attain at approximately maximum pressure difference before and behind the flap, because at other pressure differences they will attain a number of intermediate positions which, however, all will give the same quantity of air per sec. at the output end at varying pressure at the input end. In order to damp the oscillating of the flap 2 a fly wheel 4' is fixed to the shaft 4.

According to FIG. 2 the wing 3 has constant width, but same may be varied, and the wing forms shown in FIGS. 3 and 4 have given good results at different sizes of the valve.

The wing does not need to be plane, but may be bent in the longitudinal or the transverse direction. When it is stated above that said wing forms a certain angle with the flap, this means, when it is for instance the question of the bent flap 3b in FIG. 4, to be understood as the dotted line 8 between the ends of the wing.

At the embodiment shown in FIG. 3 the wing proper 3a has the form of a longish hexagon, the free end 7 of which in resting position rests against the lower wall of the valve housing, is slightly curved. According to the embodiment shown in FIG. 4, said wing 3b consists of a narrower upper rectangular portion, the upper end of which is formed with a portion 3b' which is fixed to the flap, and a lower, somewhat broader rectangular portion, the lower edge 7' of which is straight. Said two rectangular portions form together an acute angle.

FIG. 5 shows a diagram based on a test with a regulating valve according to the invention having an inner diameter of 95 mm. and the air pressure on the input side varying from 20 to 70 mm. water pile. Between the outer values 25 and 65 mm. water pile the velocity of the output air flow varies between 4.2 and 4.3 metres per second, corresponding with about 210 and 215 m.³/h., i.e. a variation of about 2.3%.

The regulating capacity of the valve is limited, for which reason not only the diameter of the valve housing, but also the form and the weight of the wing and its angular position are to be chosen in accordance with the quantity of air per time unit, as well as the pressure at the input side. Therefore, preferably in order to obtain a regulation as exact as possible, there should be constructed a series of valves in steps of 100 m.³/h. within the normal range 150 to 500 m.³/h.

The form and dimensions as well as the weight of the wing are of great importance in order to obtain a good regulating result and are to be found by tests under different working conditions and pressures. It appears from FIGS. 1 and 2 that the wing is projecting rearwardly from the flap at a place located above the upper edge of the flap. This is important, because the wing, when lifted by the air flow when passing under the lower half of the flap and acting upon the underside of the wing, being at its upper side subjected to eddy currents formed behind the upper edge of the flap. This action increases during the increased throttling, and simultaneously the action against the lower side of the wing is decreasing.

FIGS. 5 and 6 show in larger scale a pneumatic oscillating damper connected with the flap shaft 4, which has proved to be very effective to prevent rattling of the flap during varying pressure. Said damper comprises a cylinder 13 with end piece 14 and a piston rod 11 with piston 12. Said damper is journalled between two pins 10 and 16 arranged on a crank arm fixed to the shaft 4, and to an arm 7 fixed to the cylinder head respectively. The damping is either obtained by a suitable clearance between the piston and the cylinder allowing for a certain leakage, or by an adjustable screw 20 throttling an air opening 19 in the top portion of the cylinder.

To said crank levers 9 there is fixed a downwardly directed rod 17 carrying a weight 18, which may be adjusted in different positions along said rod by threads, as shown. Said rod is hanging substantially vertical when the flap 2 is in semi-open position. By finely adjusting the position of said weight 18 on the rod 17, this device may contribute in obtaining a constant air flow over a considerable greater pressure range than can be obtained without said counter weight. In the valve housing 1 there is arranged an adjustable screw 21 serving to restrict the turning movement of the flap towards closing position, the end of said screw forming an abutment for the upper side of the wing 3b just before the flap is completely closing the air passage.

What I claim is:

1. Automatic regulating valve for ventilation plants and the like, adapted for passage therethrough of a substantially constant flow of air per time unit at varying pressure in an air supply conduit, said valve comprising a horizontal shaft located in the valve housing, a regulating flap arranged turnably about said shaft and including two flap parts projecting to opposite lateral sides of the shaft, and control means co-operating with said flap, said control means comprising a wing which is fixed to and extends from the upper part of the flap in the direction of the air flow, and which forms an obtuse angle with the plane of the flap of such magnitude that during turning movement of the flap from an open position to a position closing said passage said wing is turned into a position in which it extends substantially parallel with the longitudinal axis of the valve housing before the flap is in said position closing the passage.

2. Regulating valve as claimed in claim 1, said angle being between 90° and 130°.

3. Regulating valve as claimed in claim 1, the length of said wing being so chosen that the flap forms an angle with the longitudinal axis of the housing of about 35° when no air is passing through the valve.

4. Regulating valve as claimed in claim 1, said wing projecting from the flap at a place located below the upper edge of the flap.

5. Regulating valve as claimed in claim 1, in which the shaft of the flap is connected with a pneumatic oscillation damper.

6. Regulating valve as claimed in claim 5, said ocillation damper comprising a cylinder with piston and piston rod and mounted turnably about a first pin arranged on a member connected with said shaft offset from same, and a second pin protruding from an arm connected with the valve housing.

7. Regulating valve as claimed in claim 6, wherein offset from the flap shaft and operatively connected with the same, there is an adjustable weight which hangs vertically at substantially semi-open flap position.

References Cited

UNITED STATES PATENTS

| | | | |
|---|---|---|---|
| 323,539 | 8/1885 | Smith | 137—520 |
| 426,628 | 4/1890 | Smith | 137—520 |
| 1,097,879 | 5/1914 | Reichard | 137—520 XR |
| 2,101,315 | 12/1937 | Kemp | 137—520 XR |
| 2,111,611 | 3/1938 | Brenner | 137—520 |

FOREIGN PATENTS 1,313,310  11/1962  France.

SAMUEL ROTHBERG, *Primary Examiner.*

U.S. Cl. X.R.

138—43